United States Patent
Burt et al.

(10) Patent No.: US 11,385,611 B2
(45) Date of Patent: *Jul. 12, 2022

(54) ADVANCED IDENTIFICATION AND CLASSIFICATION OF SENSORS AND OTHER POINTS IN A BUILDING AUTOMATION SYSTEM

(71) Applicant: CopperTree Analytics Ltd., Surrey (CA)

(72) Inventors: Jason Burt, Seattle, WA (US); Brice Kosnik, Snohomish, WA (US)

(73) Assignee: CopperTree Analytics Ltd., Surrey (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/903,194

(22) Filed: Jun. 16, 2020

(65) Prior Publication Data

US 2020/0310375 A1    Oct. 1, 2020

Related U.S. Application Data

(63) Continuation of application No. 16/006,421, filed on Jun. 12, 2018, now Pat. No. 10,725,444, which is a
(Continued)

(51) Int. Cl.
*G05B 19/00* (2006.01)
*G05B 19/042* (2006.01)
*G05B 15/02* (2006.01)

(52) U.S. Cl.
CPC ........... *G05B 19/042* (2013.01); *G05B 15/02* (2013.01); *G05B 2219/25011* (2013.01); *G05B 2219/2642* (2013.01)

(58) Field of Classification Search
None
See application file for complete search history.

(56) References Cited

U.S. PATENT DOCUMENTS

| 5,301,109 A | 4/1994 | Landauer et al. |
| 9,411,327 B2 | 8/2016 | Park |

(Continued)

FOREIGN PATENT DOCUMENTS

WO    2017001928    1/2017

OTHER PUBLICATIONS

International Search Report and Written Opinion for PCT/IB2016/001062 filed on Jun. 1, 2016, Applicant: buildpulse, Inc., dated Nov. 14, 2016, 11 pages.
(Continued)

*Primary Examiner* — Paul B Yanchus, III
(74) *Attorney, Agent, or Firm* — Perkins Coie LLP

(57) ABSTRACT

A building automation space facility or building automation facility comprising systems and methods for classifying and standardizing sensors and sensor data using time-series data and/or meta data, such as data and meta information available in a control network or hardware is disclosed. The disclosed system and methods provide techniques to rapidly identify and classify sensors using analysis of time-series data (e.g., data collected from a sensor such as by polling the sensor every second, minute, hour, day, month, and so on) and/or meta data (e.g., label names, group names, associated equipment, and so on) from these sensors and associated control systems. In this manner, the disclosed techniques greatly improve the extent to which a building automation facility or system monitors, manages, and reports on various elements within a building or group of buildings.

20 Claims, 6 Drawing Sheets

Related U.S. Application Data continuation of application No. 15/201,222, filed on Jul. 1, 2016, now Pat. No. 10,001,765.

(60) Provisional application No. 62/188,308, filed on Jul. 2, 2015.

(56) References Cited

U.S. PATENT DOCUMENTS

| | | |
|---|---|---|
| 10,001,765 B2 | 6/2018 | Burt et al. |
| 2006/0095521 A1 | 5/2006 | Patinkin |
| 2006/0184479 A1 | 8/2006 | Levine |
| 2008/0111680 A1 | 5/2008 | Presicci |
| 2011/0016066 A1 | 1/2011 | Hunter |
| 2011/0087650 A1 | 4/2011 | Mackay et al. |
| 2011/0087988 A1 | 4/2011 | Ray et al. |
| 2011/0088000 A1 | 4/2011 | Mackay |
| 2011/0137853 A1 | 6/2011 | Mackay |
| 2012/0011126 A1 | 1/2012 | Park et al. |
| 2012/0011141 A1 | 1/2012 | Park et al. |
| 2012/0022698 A1 | 1/2012 | Mackay |
| 2013/0021939 A1 | 1/2013 | Evennou et al. |
| 2013/0109406 A1 | 5/2013 | Meador et al. |
| 2013/0159756 A1* | 6/2013 | Ellis .......... H02J 3/00 713/340 |
| 2013/0218349 A1 | 8/2013 | Coogan et al. |
| 2014/0058539 A1 | 2/2014 | Park |
| 2015/0163096 A1 | 6/2015 | Lee et al. |
| 2016/0117646 A1 | 4/2016 | Lerick et al. |

OTHER PUBLICATIONS

Office Action dated Feb. 12, 2013 in Canadian application No. 2,991,224. 4 pages.
Office Action dated Mar. 5, 2018 in Great Britain Application No. GB1800353.3, 8 pages.
Office Action dated Oct. 3, 2019 in U.S. Appl. No. 16/006,421, 17 pages.
Office Action dated Feb. 21, 2020 in U.S. Appl. No. 16/006,421, 12 pages.
Notice of Allowance dated Apr. 30, 2020 in U.S. Appl. No. 16/006,421, 5 pages.
Office Action dated Sep. 25, 2017 in U.S. Appl. No. 15/201,222, 9 pages.
Notice of Allowance dated Apr. 12, 2018 in U.S. Appl. No. 15/201,222, 5 pages.

* cited by examiner

ADVANCED IDENTIFICATION AND CLASSIFICATION OF SENSORS AND OTHER POINTS IN A BUILDING AUTOMATION SYSTEM

CROSS-REFERENCE TO RELATED APPLICATION(S)

This application is a continuation of U.S. patent application Ser. No. 16/006,421, filed Jun. 12, 2018, titled ADVANCED IDENTIFICATION AND CLASSIFICATION OF SENSORS AND OTHER POINTS IN A BUILDING AUTOMATION SYSTEM, which is a continuation of U.S. application Ser. No. 15/201,222 filed on Jul. 1, 2016, titled ADVANCED IDENTIFICATION AND CLASSIFICATION OF SENSORS AND OTHER POINTS IN A BUILDING AUTOMATION SYSTEM (now U.S. Pat. No. 10,001,765), which claims priority to U.S. Provisional Patent Application No. 62/188,308 filed on Jul. 2, 2015, titled ADVANCED IDENTIFICATION AND CLASSIFICATION OF SENSORS BASED ON NAMES, META INFORMATION, AND TIME SERIES DATA, each of which is herein incorporated by reference in its entirety.

BACKGROUND

Building automation systems enable building owners to, among other things, quickly and easily monitor activity within the building, measure environmental factors within the building, identify inefficient processes or equipment within the building, and so on. Building automation systems are enabled by a number of sensors and other points that may be distributed throughout the building, such as temperature sensors, humidity sensors, airflow sensors, ventilation controllers, thermostats, occupancy measurements, and so on. In order for these building automation systems to properly analyze the amount of information received from various points in the building, the system must have some knowledge of what type of information each point provides. Unfortunately, these points may not be classified or labeled consistently, thereby hindering the building automation systems ability to efficiently manage or control various equipment within the building. For example, some of the points may have been classified by a manufacturer according to one classification scheme, some of these points may have been classified by an installer according to another classification scheme, some of the points may have been classified by the building owner, and so on. Furthermore, some of the points may not have been classified at all. Accordingly, a thermostat may be labeled "THERMOSTAT," "T," "TSTAT," "AC-00," "DEVICE-1594-8916," and so on. Without consistent classifications, the building automation system cannot properly or efficiently monitor, manage, and report on various elements within a building or group of buildings.

DETAILED DESCRIPTION

A building automation space facility or building automation facility comprising systems and methods for classifying and standardizing sensors and sensor data using time-series data and/or meta data, such as data and meta information available in a control network or hardware (e.g., internal memory or storage devices of sensors or other points) is disclosed. In some cases, systems in buildings and portfolios of buildings have a large number of sensors. A skyscraper, for example, might have over 2 million unique data points coming from hundreds of thousands of sensors, such as temperature sensors, Carbon Dioxide sensors, energy meters, water flow sensors, equipment status sensors (Boiler, Airhandler), humidity sensors, noise sensors, and so on. The disclosed system and methods provide techniques to rapidly identify and classify sensors using analysis of time-series data (e.g., data collected from a sensor such as by polling the sensor every second, minute, hour, day, month, and so on) and/or meta data (e.g., label names, group names, associated equipment, and so on) from these sensors and associated control systems. In this manner, the disclosed techniques address the problems presented to building automation facilities or systems and greatly improve the extent to which a building automation facility or system monitors, manages, and reports on various elements within a building or group of buildings.

A common problem in the setup and configuration of sensors used in, for example, building automation systems ("BAS") is the lack of standardization of control names between vendors as well as control installers. The underlying controller hardware accepts a number of sensor types, such as inputs and outputs, and allows users to define or name sensors with custom labels. These custom labels can make it difficult for other users or systems to determine what the actual data is. For example, a label for Room Temperature in one system might be "RMTMP," in another system it might be "Rm Temp," and in another system it might be "RT401." On top of that, often times the sensors are not labeled at all and they simply bear the name of the default port in which they are located. For example, a control system might have a port labeled "AI 00," a room temperature sensor connected to this port might be given the name "AI 00" in the control system, even though it is a temperature sensor.

The ability to rapidly identify and standardize the classification of sensors is significant for making sure systems such, as building automation controls, are operating properly, reports are accurate, as well as extending an existing system to work with third party applications.

Figure 1:
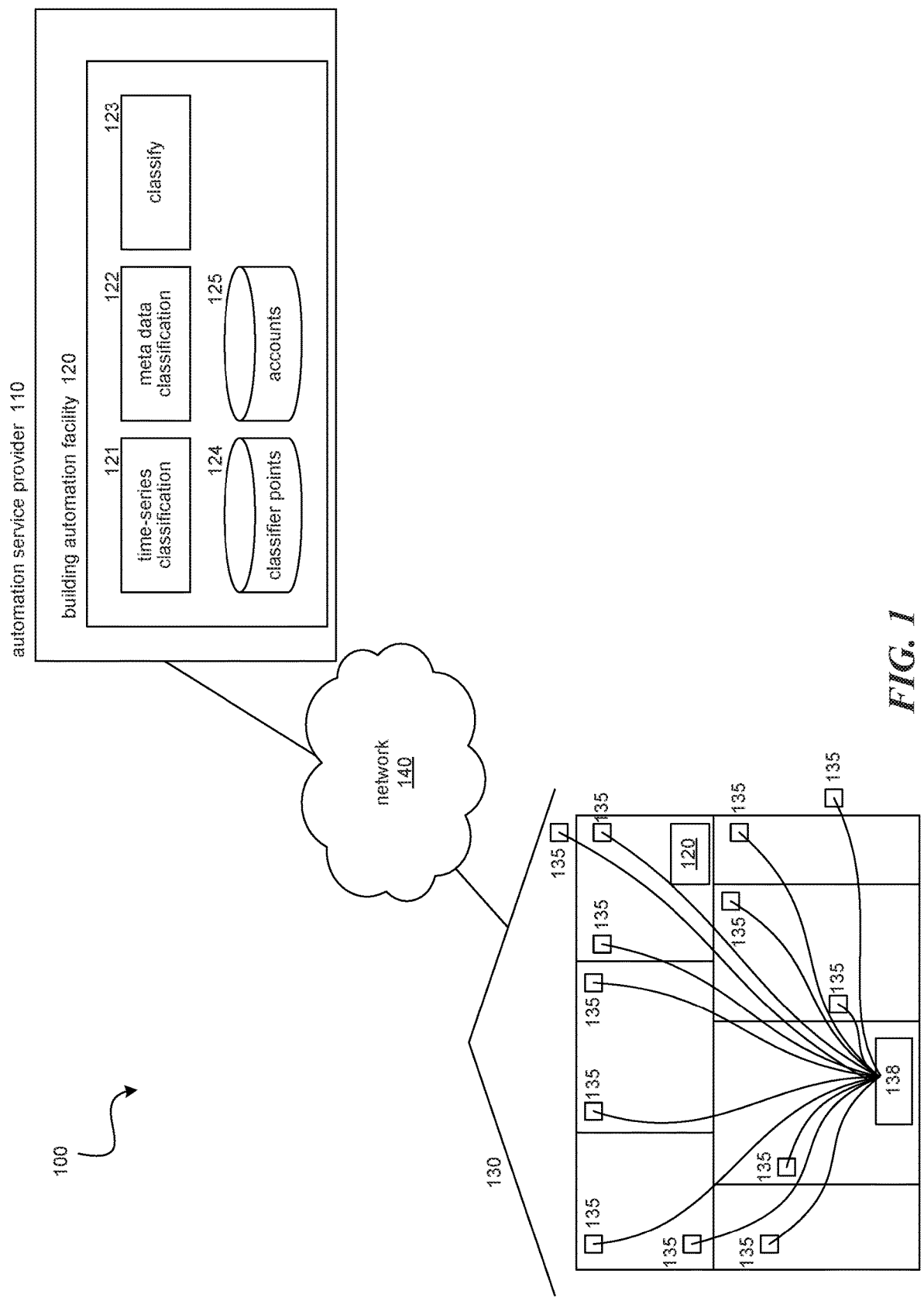
FIG. 1 is a block diagram illustrating an environment in which the building automation facility may operate in accordance with some embodiments of the disclosed technology.

FIG. 1 is a block diagram illustrating an environment 100 in which a building automation facility may operate in accordance with some embodiments of the disclosed technology. In this embodiment, environment 100 includes automation service provider 110, building automation facility 120, building 130, points 135, controller 138 (e.g., heating, ventilation, air conditioning controller, building systems controller, etc.), and network 140. Automation service provider 110 includes building automation facility 120, comprised of time-series classification component 121, meta data classification component 122, classify component 123, classifier points data store 124, and accounts data store 125. Time-series classification component 121 is invoked by the building automation facility 120 to classify points based on time-series data generated for each point and the classifier points. Meta data classification component 122 is invoked by the building automation facility 120 to classify points based on meta data extracted from a point and classifier points. Classify component 123 is invoked by the building automation facility 120 to classify points based on graduated or hierarchical sets of previously-classified points. Classifier points data store 124 stores information for points that have already been classified, such as statistical information, time-series data, meta data, labels, classifications, manufacturer information, device attributes, device types, and so on. In some embodiments, the classifier points data store serves as a classifier name library to provide classifier names or classifications of classified points in response to queries. Accounts data store 125 stores information about one or more customers, such as an indication of points that are associated with a customer, an indication of buildings that are associated with a customer, and so on. Building 130 includes several points 135 (interior and exterior) each configured to provide data to one or more building automation facilities. In this example, building 130 includes its own building automation facility, which can be used to classify points for the building 130 and other buildings (not shown). In some embodiments, building automation facilities may share information with each other or other systems. The shared information may include, for example, statistical and trend information for points, account information, and so on. In some embodiments, the various elements of environment 100 communicate via network 140.

Classification of Sensors Based on Time-Series Interval Data

In some embodiments, the disclosed technology classifies sensors by comparing their time-series data to a related sensor that has a classification. By taking statistical factors of the time-series data, such as Minimum Value, Maximum Value, Average Value, Range, Mean. and other values, the sensors can be identified using clustering analysis. That is, taking time-series data from sensors that are labeled, comparing the time-series data to time series data of sensors that are not labeled, and identifying sensors that have similar statistical profiles.

Benefits

Classification of sensors based on time-series data has significant savings in the onboarding of new systems, the monitoring and maintenance of sensors if one or more sensors goes offline or is reset, the comparison of sensors and reporting across standards, and so on.

EXAMPLE

A controller could be connected to a number of sensors that represent a zone (e.g., a room in a building). In that zone there could be one sensor that is a thermostat as well as other sensors that send data to certain ports on the controller. Furthermore, the thermostat could have a setpoint sensor that has no label in the controller that identifies it as a thermostat setpoint sensor, such as "AI 00," or a default point label in a controller system. In the example below this is labeled "Unknown Sensor."

Table 1 represents data taken from a number of labeled or classified sensors (i.e., "Room Pressure Setpoint," "Room Temperature," "Room Supply Temperature," and "Outdoor Air Cooling Lockout") and one unlabeled sensor (i.e., "Unknown Sensor").

TABLE 1

| Alias | group | max | min | mean | median | mode | range |
|---|---|---|---|---|---|---|---|
| Room Pressure Setpoint | AC_1I | 0.02 | 0.02 | 0.02 | 0.02 | 0.02 | 0 |
| Room Temperature | AC_1I | 68 | 72.5 | 72.8 | 72.85 | 72.6 | 0.9 |
| Room Supply Temperature | AC_1I | 68.4 | 65.7 | 67.0 | 67 | 67 | 2.7 |
| Outdoor Air Cooling Lockout | AC_1I | 50 | 50 | 50 | 50 | 50 | 0 |
| Unknown Sensor | AC_1A | 66.6 | 65.4 | 65.9 | 65.8 | 65.7 | 1.2 |

In some embodiments, the disclosed technology uses a combination of statistical values to calculate a "distance" between the Unknown Sensor and the labeled sensors that have been classified. The larger the distance, the less likely the Unknown Sensor is of the same type as a particular labeled sensor. In this example, a distance can be calculated as follows:

Difference Max Calculation (Diff Max)

Example: Unknown[Max value]−Classified Point [Max value]=Difference Max

Difference Range Calculation (Diff Range)

Example: Unknown[Range]−Classified Point[Range]=Difference Range

Distance Calculation

Example: (Difference Max)^2+(Difference Range)^2=Sum of Squares.

TABLE 2

| alias | group | max | range | Diff Max | Diff Range | Distance | Description |
|---|---|---|---|---|---|---|---|
| Room Pressure Setpoint | AC_1I | 0.02 | 0 | −66.58 | −1.2 | 4434.33 | |
| Room Temperature | AC_1I | 68 | 0.9 | 1.4 | −.3 | 2.05 | Closest Match |
| Room Supply Temperature | AC_1I | 68.4 | 2.7 | 1.8 | −1.5 | 5.49 | |
| Outdoor Air Cooling Lockout | AC_1I | 50 | 0 | −16.6 | −1.2 | 277 | |
| Unknown Sensor | AC_1A | 66.6 | 1.2 | 0 | 0 | 0 | Point to match |

In Table 2, the labeled sensor producing the smallest distance (i.e., 2.05) from the "Unknown Sensor" is the sensor labeled "Room Temperature." Thus, the "Unknown Sensor" is most likely a Room Temperature sensor. In some embodiments, the disclosed technology uses a threshold value to determine whether the closest match is "close enough." For example, the disclosed technology may establish a threshold of 100 and ignore any sensor having a distance greater than 100 (the threshold), even if it is the closest match (resulting in the Unknown Sensor remaining unlabeled). In some cases, the system may prompt a user for a label. Although this example uses Max Value and Range as statistical values for calculating a distance, one of ordinary skill in the art will recognize that any statistical value or combination of statistical values, such as max, min, median, mode, stdev, variance, rate of change, average rate of change, and others, can be used in the calculation of a distance value. Furthermore, any number and combination of values and their differences can be used to calculate a distance (e.g., sqrt(diffmode^2+diffstdev^2+diffvariance^2+ diffrateofchange^2)).

In addition, a weight can be added to each distance, for example average and max value might be better at matching than min and median. So, a weight/multiplier can be added to the value to increase the match likelihood. Variables determined to be more important would have a higher multiplier than variables determined to be less important.

Example Equation with Multiplier (Difference Max)^2*[Max Multiplier]+(Difference Average)^2*[Average Multiplier]

This multiplier can be hardcoded based on observation or can be calculated by comparing calculations based on a number of points. For example if the system knows that Outside Air Temperature and Indoor Air temperature were often close to each other, the system could fine tune the weight for each by calculating a percent match based on a known Outside Air Temperature versus known Indoor Air Temperatures. Also, by changing the sample time, such as comparing 30-minute increments versus day increments, can increase the likelihood of match. In addition, choosing specific days, such as weekdays versus weekends or holidays versus non-holidays, can increase the accuracy of the match since many sensors are controlled or set by humans and these different groups of days can have different readings as a result.

Example Workflow for Time-Series Calculation

Figure 2:
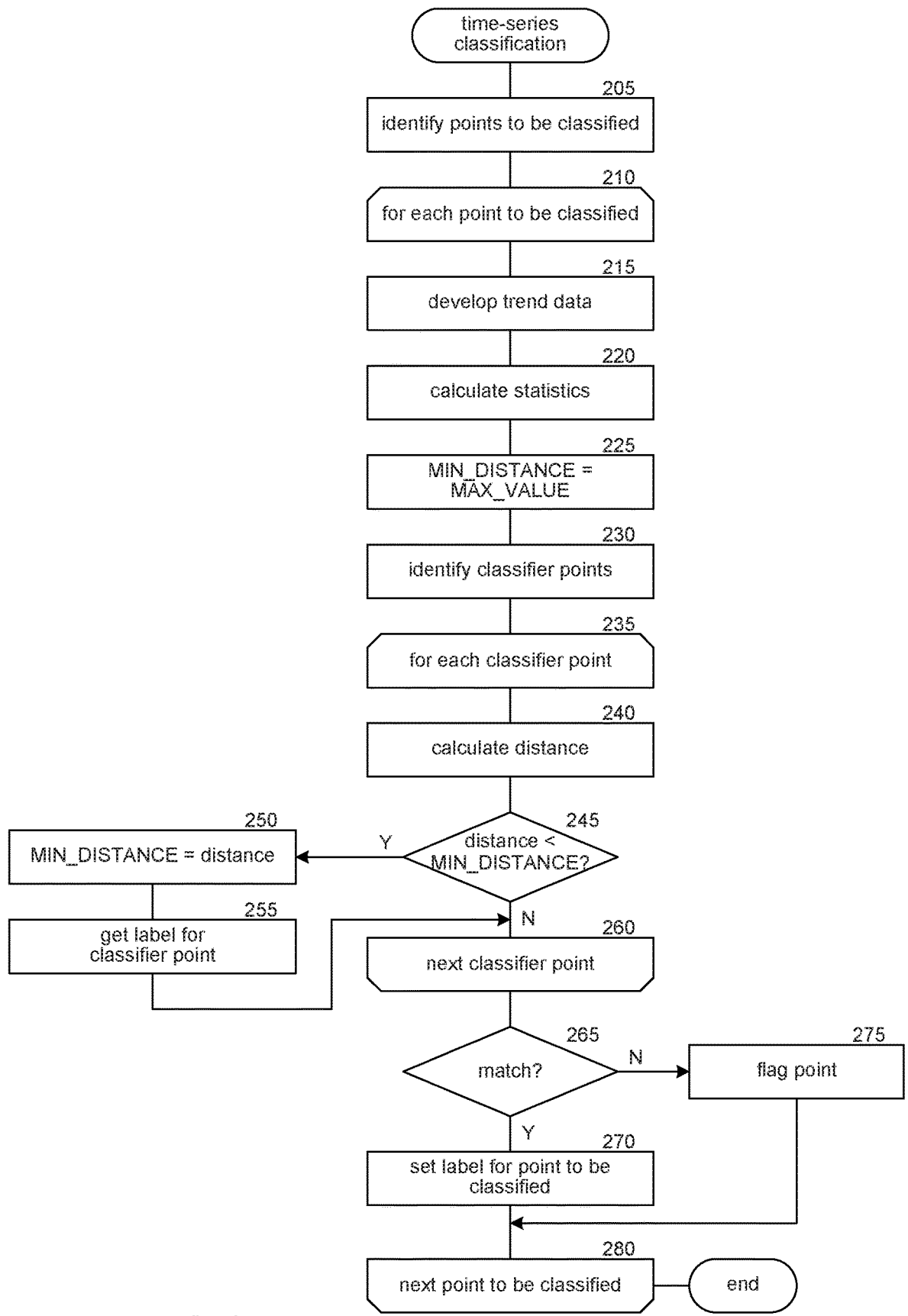
FIG. 2 is a block diagram illustrating the processing of a time-series classification component.

FIG. 2 is a block diagram illustrating the processing of a time-series classification component in accordance with some embodiments of the disclosed technology. In block 205, the component identifies points—e.g., data points (such as thermostats, occupancy counters, fan switches, etc.) and sensors (such as temperature sensors, occupancy sensors, humidity sensors, etc.)—to be classified and labeled. For example, the component may connect to a controller to communicate with various sensors and other data points to identify available points and/or points that have yet to be classified, named, and/or labeled. In blocks 210-280, the component loops through each of the identified points to be classified and attempts to classify or label each point. In block 215, the component collects data from the currently-selected point to be classified to develop trend data for the point. For example, the component may poll the point periodically (e.g., every second, every minute, every hour, every day) to collect a series of measurements from the point. This polling may take place over a predetermined period of time, such as a minute, an hour, a day, a week, a month, and so on. In block 220, the component calculates statistics from the developed trend data, such as a MEAN value, a MAX value, a MIN value, a MODE value, a MEDIAN value, a standard deviation, variance, and so on. In some embodiments, these statistics may be stored in association with each point in the form of an array, vector, or other data structure. In block 225, the components sets a MIN_DISTANCE value to a predetermined MAX_VALUE. In block 230, the component identifies available classifier points (e.g., a training set of sensor labels or aliases of sensors that have been classified). In blocks 235-260, the component loops through each of the identified classifier points and compares statistics for a currently-selected classifier point to statistics for the currently-selected point to be classified. In block 240, the component calculates the distance or difference between the currently-selected classifier point to statistics for the currently-selected point to be classified based on the statistics for each. For example, the component may calculate the distance or difference between each of a plurality of statistical value pairs (e.g., the difference between a MEAN value for the currently-selected classifier point and a MEAN value for the currently-selected point to be classified, the difference between a MIN value for the currently-selected classifier point and a MIN value for the currently-selected point to be classified, the difference between a MAX value for the currently-selected classifier point and a MAX value for the currently-selected point to be classified), square each differences, and take the sum of the squares. One of ordinary skill in the art will recognize that a distance or difference between two sets of values (e.g., two sets of arrays or vectors) may be determined in any number of ways. In decision block 245, if the calculated distance or difference is less than the current MIN_DISTANCE value, then the component continues at block 250, else the component continues at block 260. In block 250, the component sets the MIN_DISTANCE value equal to the calculated distance or difference. In block 255, the component gets the label for the currently-selected classifier point. In block 260, if there are any remaining classifier points the component loops back to block 235 to select the next classifier point, else the component continues at decision block 265. In decision block 265, if there is a match between the currently-selected point to be classified and the classifier points (i.e., if the MIN_DISTANCE value is below a predetermined threshold), then the component continues at block 270, else the component continues at block 275. In block 270, the component sets the label for the currently-selected point to be classified to the most recently-retrieved label (block 255) by, for example, storing the label for the currently-selected point in the classifier point store, causing the point to store the label, and/or controlling the currently-selected point to write the label to internal storage, etc. In block 275, the component flags the currently-selected point to be classified as not adequately matching with any of the classifier points. In block 280, if there are any remaining points to be classified (that have not been flagged) the component loops back to block 210 to select the next point to be classified, else processing of the component completes. In some embodiments, a means for performing a time-series classification of one or more points comprises one or more computers or processors configured to carry out an algorithm disclosed in FIG. 2 and this paragraph as described therein.

Classification of Sensors Based on Label and Meta Data

Often times the systems that connect the controllers together allow for user input for naming data points and sensors. Installers and manufactures often have different naming conventions. Outside Air Temperature might be labeled as "Outside Air" in one system, "OAT" in another, and "Outside Air Temperature" in yet another. Furthermore, since many of the systems require someone to manually enter the names, the labels can be mistyped, such as "Ou Air Temper," "OutATemp," and so on.

The classification of sensor data using labels and meta data by comparing names and meta data from a training set of sensor labels or aliases of sensors that have been classified is described below.

Classification Example

For example, a sensor that measures the temperature outdoors can be labeled in a number of ways. Example labels for a sensor that measures Outdoor Air Temperature include:

OAT

Out Door Air Temperature

Out Door Ar Temp

OATemp

All of these sensor names could be used to classify a corresponding sensor as an Outdoor Air Temperature sensor. In the example below, the name "Alias" is used for the classification label for sensors that have been classified.

In some embodiments, the disclosed technology classifies these labels by separating them into constituent parts according to one or more delimiter rules, such as CamelCase, spacing, or other special characters/delimiters. Since users often use abbreviated versions of words, such as "OAT" for Outside Air Temperature, as well as misspell words (e.g., "Ar" instead of "Air"), the disclosed technology can do an initial match using just the first letter of the CamelCase letter for each tag. The results of separating the above-mentioned labels according to CamelCase rules are provided below in Table 3A. In this example, each separate portion is labeled as a separate "Tag."

TABLE 3A

| Sensor Name | Tag1 | Tag2 | Tag3 | Tag4 |
|---|---|---|---|---|
| OAT | O | A | T | |
| Out Door Air Temperature | Out | Door | Air | Temperature |
| Out Door Ar Temp | Out | Door | Ar | Temp |
| OATemp | O | A | Temp | |

TABLE 3B

| Classifier Name | Tag1 | Tag2 | Tag3 | Tag4 |
|---|---|---|---|---|
| Outdoor Air Temperature | Outdoor | Air | Temperature | |

The results of separating the above-mentioned labels according to CamelCase rules and using only the first letter of each tag are provided below in Table 4A. In this example, each separate portion is labeled as a separate "Tag." Comparing the tags of each sensor name in Table 3A or Table 4A to the tags of a classifier name (i.e., the label of a sensor that has been classified), such as "Outdoor Air Temperature" in Table 3B or Table 4B, the disclosed technology can generate a match percentage. The match percentage is the total number of tags that match between the classifier name and the sensor name divided by the total number of tags associated with the sensor name.

TABLE 4A

| Sensor Name | Tag1 | Tag2 | Tag3 | Tag4 | Match Percent | Alias |
|---|---|---|---|---|---|---|
| OAT | O | A | T | | 3/3 = 100% | Not identified |
| Out Door Air Temperature | O | D | A | T | 3/4 = 75% | Not identified |
| Out Door Ar Temp | O | D | A | T | 3/4 = 75% | Not identified |
| OATemp | O | A | T | | 3/3 = 100% | Not identified |

TABLE 4B

| Classifier Name | Tag1 | Tag2 | Tag3 | Tag4 | Match Percent | Alias |
|---|---|---|---|---|---|---|
| Outdoor Air Temperature | O | A | T | | Classifier | Outside Air Temperature |

Example calculations: For the "Out Door Air Temperature" sensor name in Table 4A, there are four total tags: 'O,' 'D,' 'A' and 'T' and three of these tags match a tag of the classifier "Outdoor Air Temperature" (i.e., 'O,' 'A,' and 'T'). Accordingly, the match percentage is 75% (i.e., 3/4). For the 'COAT' sensor name in table 4, there are three total tags: 'O,' 'A,' and 'T' and all three of these tags match. Accordingly, the match percentage is 100% (i.e., 3/3). In some embodiments, the disclosed technology uses a library of classifier names, comparing one or more names in the library to sensor names for non-classified sensors and, for each non-classified sensor, attributes the classifier name with the highest match percentage to the non-classified sensor that exceeds a predetermined threshold (e.g., 0%, 10%, 50%, 75%, 95%, etc.).

Example Classifying Against Sensors Grouped in a Controller

While the above example works for classifying sensors in general, the accuracy of identification can be increased by comparing sensors that are linked to the same controller. A controller could be connected or in communication with sensors that have labels such as, "Return Air Temp," "Outdoor Air Temperature," and "Set Point" in addition to an unlabeled sensor. Using the match percentage technique disclosed above and using a match percentage threshold (e.g., 70%) the sensor that measures the outdoor air temperature can be classified.

The example table below shows a sensor with the label "OutDoor Air Temperature" being classified.

In this example, the label "Return Air Temp" has three tags: 'R,' 'A,' and 'T,' and the classifier name "Outdoor Air Temperature" has three tags: 'O,' 'A,' and 'T.' Two of the sensor's three tags match (i.e., 'A' and 'T'), resulting in a match percentage of 66.6%.

TABLE 5A

| Sensor Name | Tag1 | Tag2 | Tag3 | Tag4 | Match |
|---|---|---|---|---|---|
| Return Air Temp | R | A | T | | 2/3 = 66.6% |
| OutDoor Air Temperature | O | D | A | T | 3/4 = 75% |
| Set Point | S | P | | | 0/3 = 0% |
| AI 00 | A | I | 0 | 0 | 1/4 = 25% |

TABLE 5B

| Classifier Name | Tag1 | Tag2 | Tag3 | Tag4 | Match |
|---|---|---|---|---|---|
| Outdoor Air Temperature | O | A | T | | Classifier |

Simplifying Classification by Grouping Sensors Based on System Type

In some embodiments, the sensors being classified are grouped by the type of system being classified. For example a controller that represents a room or zone in the real world would have a number of sensors or other points, such as a Room Temperature sensor, Set Point, and occupancy sensor. An Airhandler on the other hand would have an Outdoor Air Temperature sensor, Return Air Temperature sensor, and Room Temperature sensors. A determination of what type of sensors belong to what type of system can be done before the classification by, for example, taking a point or sensor's meta data (e.g., what controller the sensor is under or information in the name, such as points that have the equipment or room name in them). An example point might have the name "Rm203 Rm Temp" which implies it can be grouped with other points that have "Rm203" in their name. Similarly, if a group of points (sensors) are each associated with a particular controller model (e.g., VAV-SD2A), these points and be grouped together. By identifying what sensors in a controller belong to specific physical pieces of equipment, and limiting the classifiers to that type of equipment, the disclosed technology can classify individual sensors and groups of sensors with more accuracy and efficiency.

EXAMPLE

A building might have sensors such as those represented in Table 6A. Those sensors belong to certain controllers that represent an AirHandler (AHU), a zone, and general sensors (Global). Matching based on tagging, as described, is applied to a number of sensors in a building, and those sensors are associated with groups that correspond with the type of equipment they are part of.

The tags "R," "A," and "T" are created for the "Return Air Temperature" name using the system described above. Those tags are then compared to a classifier name or library of classifier names that are specific to a group type (e.g., a library of classifier names specific to a "Room" group comprising the following classifier names: "Room Temperature," "Room Humidity," and "Room Cooling Setpoint"). The "Room Temperature" name has the tags "R" and "T." The match percentage between "Room Temperature" and "Return Air Temperature" is calculated by dividing the total number of tags in the point or sensor name (or label) that match the tags in the classifier name and dividing by the total number of tags in the point or sensor name.

2 Match/3 total=66.6%.

The results are shown in the table below. Although the "RM Temp" name and the "Return Air Temp" name both have the same match percentage (i.e., 66.6%), the "Return Air Temp" name can be eliminated because the group it belongs to is not a zone, whereas the classifier name belongs to the zone group.

TABLE 6A

| Sensor Name | Group | Tag1 | Tag2 | Tag3 | Tag4 | Match | Outcome |
|---|---|---|---|---|---|---|---|
| Return Air Temperature | AHU | R | A | T | | 2/3 = 66.6% | Eliminated, not a zone group |
| OutDoor Air Temperature | Global | O | D | A | T | 2/4 = 50% | |
| Set Point | Zone | S | P | | | 0/3 = 0% | |
| AI 00 | Zone | A | I | 0 | 0 | 0/4 = 0% | |
| RM Temp | Zone | R | M | T | | 2/3 = 66.6% | Highest match in zone |

TABLE 6B

| Classifier Name | Group | Tag1 | Tag2 | Tag3 | Tag4 | Match | Outcome |
|---|---|---|---|---|---|---|---|
| Room Temperature | Zone | R | T | | | | Classifier |

Example Workflow for Metadata Classification

Figure 3:
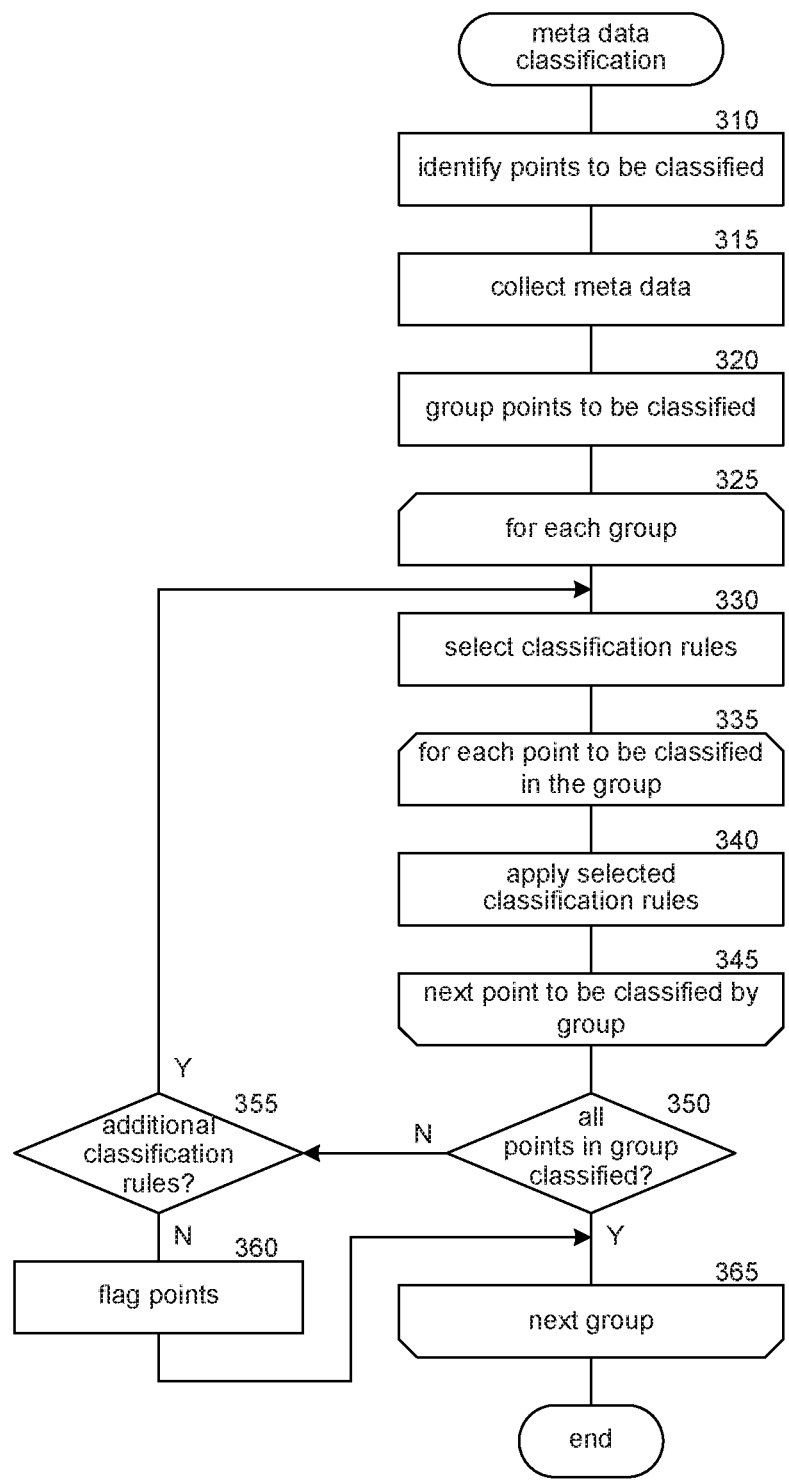
FIG. 3 is a block diagram illustrating the processing of a meta data classification component.

FIG. 3 is a block diagram illustrating the processing of a meta data classification component in accordance with some embodiments of the disclosed technology. In block 310, the component identifies points to be classified. In block 315, the component collects meta data from each point, such as manufacturer's information, any current labels for the point, a location for the point, a type for the point, any current tags for the point, and so on. In block 320, the component groups points to be classified. For example, the component may group points based on metadata such as which rooms each point is in, which controller is associated with or responsible for the point, or other grouping techniques described above. In blocks 325-365, the component loops through each point to be classified and attempts to classify the point. In block 330, the component selects a set of classification rules, such as splitting any labels associated with the point into constituent parts (e.g., words, letters, phonemes) and identifying matches to classifier points, splitting any labels associated with the point into constituent first letters and identifying matches to classifier points, comparing sets of non-classified points in one zone or area to sets of classified points in another zone or area, and so on. In blocks 335-345, the component loops through each of the points in the group of points to be classified and applies the selected classification rules to each point. In block 340, the component applies the selected classification rules to the currently-selected point in the group and, if there is a sufficient match (e.g., the match percentage exceeds a predetermined threshold), then the point in the group is assigned a label based on the matching classifier point. In block 345, if there are any remaining points in the group of points to be classified, the component loops back to block 335 to select the next point in the group, else the component continues at decision block 350. In decision block 350, if all of the points in the group have been classified, then the component continues at block 365, else the component continues at decision block 355. In decision block 355, if there are additional classification rules, then the component loops back to block 330, else the component continues at block 360. In block 360, the component flags any points that were not classified. In block 365, if there are any remaining groups of points to be classified, the component loops back to block 325 to select the next group, else processing of the component completes. In some embodiments, a means for performing a meta data classification of one or more points comprises one or more computers or processors configured to carry out an algorithm disclosed in FIG. 3 and this paragraph as described therein.

Classification of Sensors Based on Meta Data with Time-Series Interval Data

A more advanced filter can be created by systematically going through the sensors that are labeled in the system and applying combinations of the time-series classification and meta data/label classification.

EXAMPLE

Figure 4:
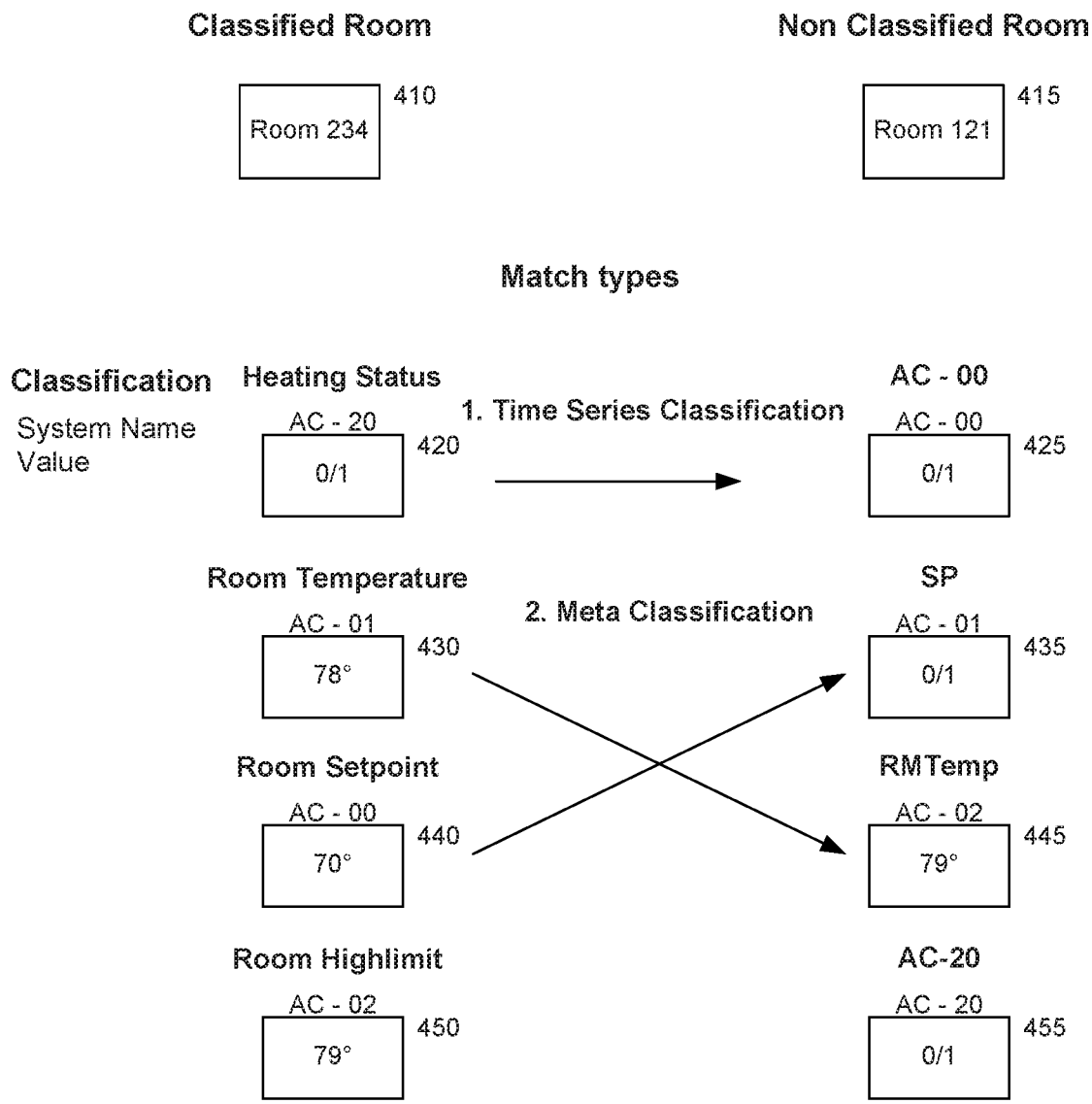
FIG. 4 is a block diagram illustrating a number of sensors classified using 1) Time-Series Classification and 2) Meta Classification techniques and 3) sensors that are left to classify.

FIG. 4 is a block diagram illustrating a number of sensors classified using 1) Time-Series Classification and 2) Meta Classification techniques and 3) sensors that are not yet classified. In this example, a Heating Status sensor is identified using a time-series classification. After that, a meta classification technique is run on the remaining sensors and the Room Setpoint and Heating Status sensors are identified. Lastly the sensor labeled "AC-20," which was not classified using the time-series or meta classification techniques, is flagged for a user to look at because, for example, the sensor could be set up or grouped incorrectly. This example illustrates the classification of points in one room (Room 234) 410 by comparing the points therein to classified points in another room (Room 121) 415. In a building, unlabeled points (e.g., sensors) in one room could be classified and labeled based on sensors in a similar room. Thus, if the sensors in Room 234 were classified and the sensors in Room 121 were not classified, the system could use a number of methods disclosed herein to classify sensors in Room 121 based on information gathered from the sensors in Room 234. For example, meta classification could be applied to identify two sensors as "Room Temperature" and "SetPoint" based on current labels of points 430 ("Room Temperature") and 445 ("RMTemp") and 440 ("Room Setpoint") and 435 ("SP"), respectively. This leaves AC-00 425 and AC-20 455 as remaining sensors that need to be classified. Applying a time-series data analysis, may identify AC-00 425 in the non-classified room (Room 121) as a Heating Status point based on statistical values generated from trend data for points 420 and 425. In this example, Room Highlimit point AC-02 450 was not used to classify any of the non-classified points shown, although. After the algorithms are run, any remaining unclassified sensors can be flagged as unclassified. In this manner, any combination of time-series classification and meta data classification may be employed to classify points in various buildings and rooms.

Figure 5:
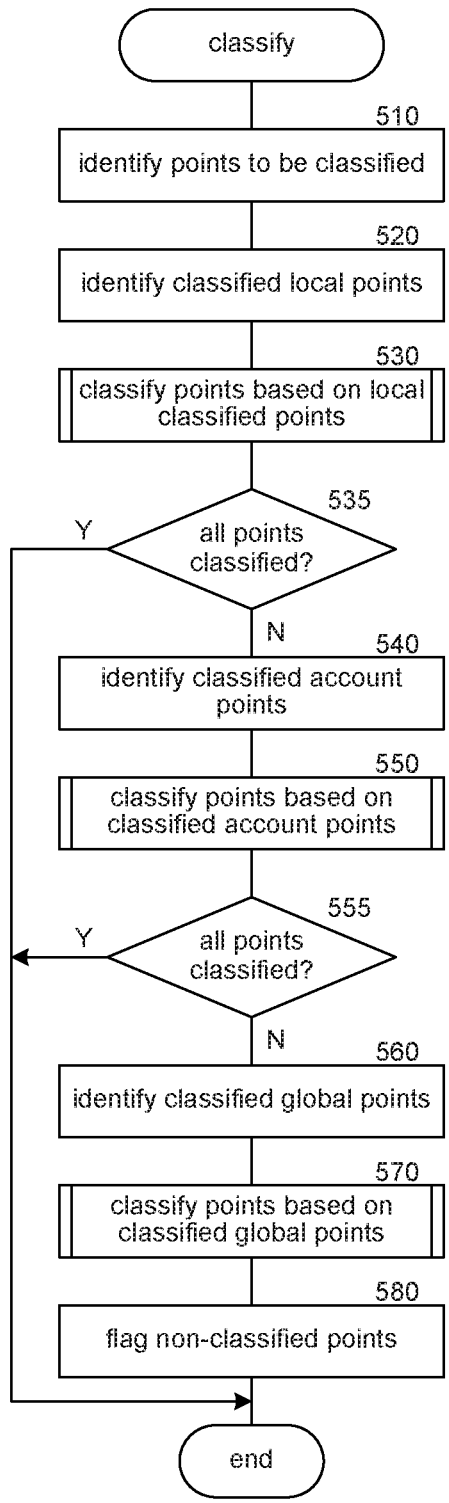
FIG. 5 is a flow diagram illustrating the processing of a classify component.

FIG. 5 is a flow diagram illustrating the processing of a classify component in accordance with some embodiments of the disclosed technology. The classify component is invoked to classify points based on graduated sets of previously-classified points (i.e., classifier points). In block 510, the component identifies points to be classified. In block 520, the component identifies classified local points, such as classified points that are in the same room or building of the points to be classified, points that are controlled by the same controller, and so on. In some embodiments, this information may be retrieved from the points themselves, from a controller in communication with the points, and so on. In block 530, the component invokes one or more classification components (e.g., a time-series classification component, a meta data classification, or both) to attempt to classify the identified points using the classified local points as the classifier points. In decision block 535, if all of the points to be classified are classified then processing of the component completes, else the component continues at block 540. In block 540, the component identifies classified account points, such as classified points that are in a building associated with the same account (i.e., customer) as the points to be classified. In some embodiments, this information may be retrieved from the points themselves, from a controller in communication with the points, and so on. In block 550, the component invokes one or more classification components (e.g., a time-series classification component, a meta data classification, or both) to attempt to classify the identified points using the classified account points as the classifier points. In decision block 555, if all of the points to be classified are classified then processing of the component completes, else the component continues at block 560. In block 560, the component identifies all other classified points (i.e., non-local, non-account points) from, for example, a classifier data store or classifier name data store. In block 570, the component invokes one or more classification components (e.g., a time-series classification component, a meta data classification, or both) to attempt to classify the identified points using the other classified points as classifier points. In block 580 the component flags any non-classified points and then completes. In some embodiments, a means for performing a hierarchical classification of one or more points comprises one or more computers or processors configured to carry out an algorithm disclosed in FIG. 5 and this paragraph in the order described therein.

Figure 6:
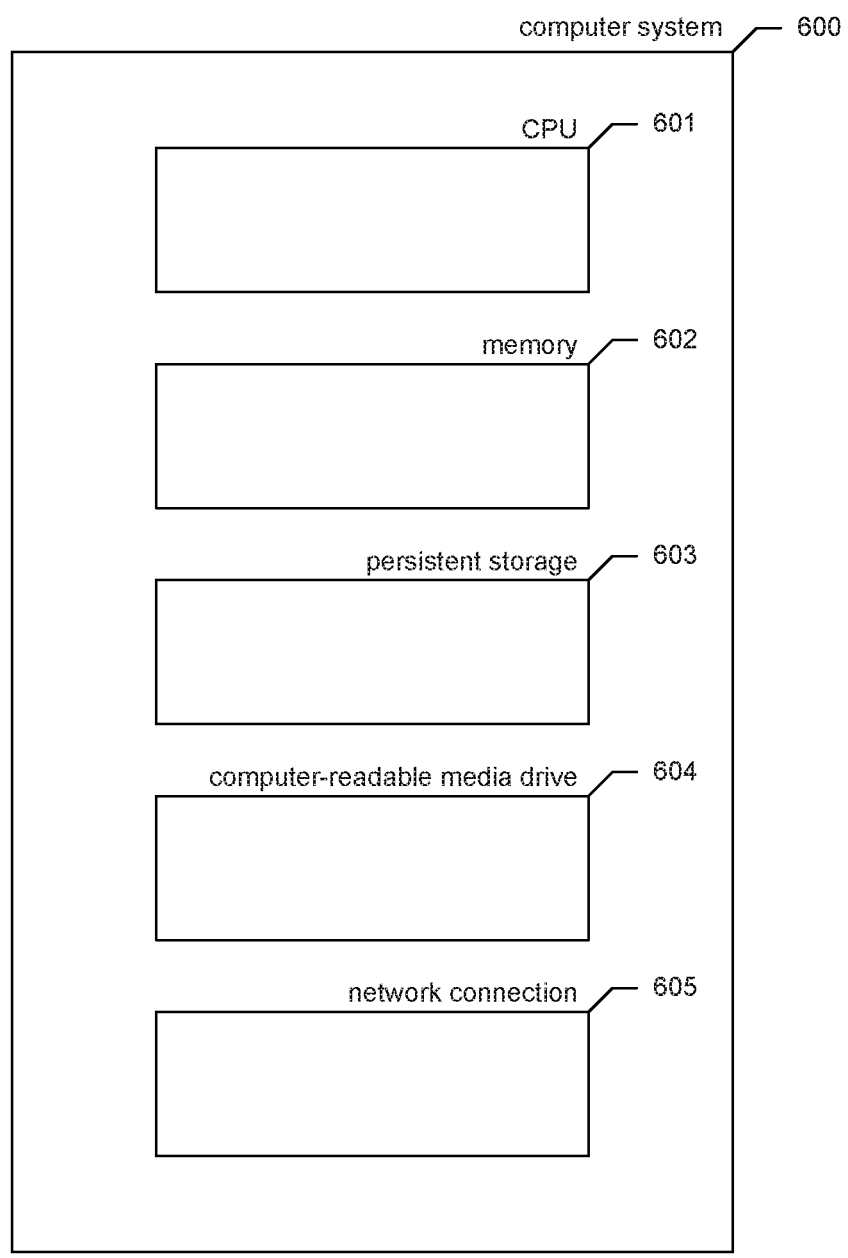
FIG. 6 is a block diagram illustrating some of the components that may be incorporated in at least some of the computer systems and other devices on which the system operates and interacts with in some examples.

FIG. 6 below is a block diagram illustrating some of the components that may be incorporated in at least some of the computer systems and other devices on which the system operates and interacts with in some examples. In various examples, these computer systems and other devices 600 can include server computer systems, desktop computer systems, laptop computer systems, netbooks, tablets, mobile phones, personal digital assistants, televisions, cameras, automobile computers, electronic media players, and/or the like. In various examples, the computer systems and devices include one or more of each of the following: a central processing unit ("CPU") 601 configured to execute computer programs; a computer memory 602 configured to store programs and data while they are being used, including a multithreaded program being tested, a debugger, an operating system including a kernel, and device drivers; a persistent storage device 603, such as a hard drive or flash drive configured to persistently store programs and data; a computer-readable storage media drive 604, such as a floppy, flash, CD-ROM, or DVD drive, configured to read programs and data stored on a computer-readable storage device, such as a floppy disk, flash memory device, a CD-ROM, a DVD; and a network connection 605 configured to connect the computer system to other computer systems to send and/or receive data, such as via the Internet, a local area network, a wide area network, a point-to-point dial-up connection, a cell phone network, or another network and its networking hardware in various examples including routers, switches, and various types of transmitters, receivers, or computer-readable transmission media. While computer systems configured as described above may be used to support the operation of the disclosed techniques, those skilled in the art will readily appreciate that the disclosed techniques may be implemented using devices of various types and configurations, and having various components. Elements of the disclosed systems and methods may be described in the general context of computer-executable instructions, such as program modules, executed by one or more computers or other devices. Generally, program modules include routines, programs, objects, components, data structures, and/or the like configured to perform particular tasks or implement particular abstract data types and may be encrypted. Moreover, the functionality of the program modules may be combined or distributed as desired in various examples. Moreover, display pages may be implemented in any of various ways, such as in C++ or as web pages in XML (Extensible Markup Language), HTML (HyperText Markup Language), JavaScript, AJAX (Asynchronous JavaScript and XML) techniques or any other scripts or methods of creating displayable data, such as the Wireless Access Protocol ("WAP").

The following discussion provides a brief, general description of a suitable computing environment in which the invention can be implemented. Although not required, aspects of the invention are described in the general context of computer-executable instructions, such as routines executed by a general-purpose data processing device, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), heating, ventilation, and air-conditioning controller (HVAC) controller, special-purpose HVAC controller, programmable HVAC controller, wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on computer-readable storage media, including magnetically or optically readable computer discs, hard-wired or preprogrammed chips (e.g., EEPROM semiconductor chips), nanotechnology memory, biological memory, or other data storage media but not including transitory, propagating signals. Alternatively, computer implemented instructions, data structures, screen displays, and other data under aspects of the invention may be distributed over the Internet or over other networks (including wireless networks), on a propagated signal on a computer-readable propagation medium or a computer-readable transmission medium (e.g., an electromagnetic wave(s), a sound wave, etc.) over a period of time, or they may be provided on any analog or digital network (packet switched, circuit switched, or other scheme). Non-transitory computer-readable media include tangible media such as hard drives, CD-ROMs, DVD-ROMs, and memories such as ROM, RAM, and Compact Flash memories that can store instructions and other storage media. Signals on a carrier wave such as an optical or electrical carrier wave are examples of transitory computer-readable media. "Computer-readable storage media," as used herein, comprises all computer-readable media except for transitory, propagating signals.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. For example, while several of the examples provided above are described in the context of sensors, one of ordinary skill in the art will recognize that these techniques can be applied to other points, such as controllers, data sources, and so on. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for", but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application. To the extent any materials incorporated herein by reference conflict with the present disclosure, the present disclosure controls.

We claim:

1. A method, performed by a building automation system having at least one processor and at least one memory, for classifying points in one or more buildings, the comprising:
   for each of a first plurality of non-classified points of the one or more buildings,
      retrieving time-series data for the non-classified point of the first plurality of non-classified points of the one or more buildings,
      for each of a plurality of classified points,
         retrieving time-series data for the classified point, and
         determining a distance between the classified point and the non-classified point based at least in part on the retrieved time-series data for the non-classified point of the first plurality of non-classified points of the one or more buildings, and
      determining whether a smallest distance determined for the non-classified point of the one or more buildings is less than a first predetermined threshold.

2. The method of claim 1, further comprising:
   for each of the first plurality of non-classified points of the one or more buildings,
      further in response to determining that the smallest distance determined for the non-classified point of the one or more buildings is less than the first predetermined threshold,
         identifying the classified point with the smallest determined distance from the non-classified point.

3. The method of claim 2, further comprising:
   for each of the first plurality of non-classified points of the one or more buildings,
      further in response to determining that the smallest distance determined for the non-classified point of the one or more buildings is less than the first predetermined threshold,
         retrieving a label for the determined classified point with the smallest determined distance, and
         attributing, to the non-classified point, the retrieved label for the determined classified point with the smallest determined distance from the non-classified point.

4. The method of claim 1, wherein the points include water flow sensors and equipment status sensors.

5. The method of claim 1, further comprising:
   identifying a subset of the classified points as classified account points; and
   for each of a second plurality of non-classified points,
      attempting to classify the non-classified point of the second plurality of non-classified points based on classified points selected from a group of classified account points.

6. The method of claim 1, further comprising:
   for each of a second plurality of non-classified points of the one or more buildings,
      retrieving a point name for the non-classified point of the second plurality of non-classified points, and
      for each of a plurality of classifier names,
         determining a match percentage for the non-classified point of the second plurality of non-classified points at least in part by comparing the classifier name to the point name retrieved for the non-classified point of the second plurality of non-classified points.

7. The method of claim 1, wherein at least one of the points is a sensor and wherein at least one of the points is not a sensor.

8. A building automation system for classifying points in one or more buildings, the system comprising:
   one or more processors;
   one or more memories; and
   a component configured to, for each of a first plurality of non-classified points of the one or more buildings,
      retrieve time-series data for the non-classified point of the first plurality of non-classified points of the one or more buildings, for each of a plurality of classified points,
retrieve time-series data for the classified point, and
determine a distance between the classified point and the non-classified point based at least in part on the retrieved time-series data for the non-classified point of the first plurality of non-classified points of the one or more buildings,
determine whether a smallest distance determined for the non-classified point of the one or more buildings is less than a first predetermined threshold, and
in response to determining that the smallest distance determined for the non-classified point of the one or more buildings is less than the first predetermined threshold,
identify the classified point with the smallest determined distance from the non-classified point,
retrieve a label for the determined classified point with the smallest determined distance, and
attribute, to the non-classified point, the retrieved label for the determined classified point with the smallest determined distance from the non-classified point,
wherein the component comprises computer executable instructions stored in the one or more memories for execution by the one or more processors.

9. The building automation system of claim 8, further comprising:
a component configured to, for each of a plurality of statistical measures,
determine a value of the statistical measure for a first classified point,
determine a value of the statistical measure for a first non-classified point, and
determine a difference between the determined values of the statistical measure.

10. The building automation system of claim 9, further comprising:
a component configured to, for each of the determined differences,
determine the square of the determined difference;
a component configured to determine the sum of the determined squares; and
a component configured to determine the square root of the determined sum.

11. The building automation system of claim 8, further comprising:
means for performing a meta data classification of one or more of the first plurality of non-classified points.

12. The building automation system of claim 8, wherein the points include temperature sensors, Carbon Dioxide sensors, and energy meters.

13. The building automation system of claim 8, wherein the points include humidity sensors and noise sensors.

14. The building automation system of claim 8, further comprising:
a component configured to, for each of a second plurality of non-classified points of the one or more buildings,
retrieve a point name for the non-classified point of the second plurality of non-classified points, and
for each of a plurality of classifier names,
determine a match percentage for the non-classified point of the second plurality of non-classified points at least in part by comparing the classifier name to the point name retrieved for the non-classified point of the second plurality of non-classified points.

15. A computer-readable storage medium storing instructions that, if executed by a building automation system having at least one processor and at least one memory, cause the building automation system to perform operations for classifying points in one or more buildings, the operations comprising:
for each of a first plurality of non-classified points of the one or more buildings,
retrieving time-series data for the non-classified point of the first plurality of non-classified points of the one or more buildings,
for each of a plurality of classified points,
determining a distance between the classified point and the non-classified point based at least in part on the retrieved time-series data for the non-classified point of the first plurality of non-classified points of the one or more buildings,
determining whether a smallest distance determined for the non-classified point of the one or more buildings is less than a first predetermined threshold, and
in response to determining that the smallest distance determined for the non-classified point of the one or more buildings is less than the first predetermined threshold,
identifying the classified point with the smallest determined distance from the non-classified point.

16. The computer-readable storage medium of claim 15, the operations further comprising:
for each of the first plurality of non-classified points of the one or more buildings,
in response to determining that the smallest distance determined for the non-classified point of the one or more buildings is less than the first predetermined threshold,
retrieving a label for the determined classified point with the smallest determined distance, and
attributing, to the non-classified point, the retrieved label for the determined classified point with the smallest determined distance from the non-classified point.

17. The computer-readable storage medium of claim 15, the operations further comprising:
for each of the first plurality of non-classified points of the one or more buildings,
for each of the plurality of classified points,
determining a second distance between the classified point and the non-classified point based at least in part on the retrieved time-series data for the non-classified point of the first plurality of non-classified points of the one or more buildings.

18. The computer-readable storage medium of claim 17, the operations further comprising:
associating a weight to each of the determined distances.

19. The computer-readable storage medium of claim 15, wherein the points include equipment status sensors and noise sensors.

20. The computer-readable storage medium of claim 15, the operations further comprising:
for each of the plurality of classified points,
retrieving time-series data for the classified point.

* * * * *